July 28, 1964  M. TAMINI  3,142,363
STABILIZING AND SHOCK-ABSORBING DEVICE
Filed Dec. 5, 1961  3 Sheets-Sheet 2
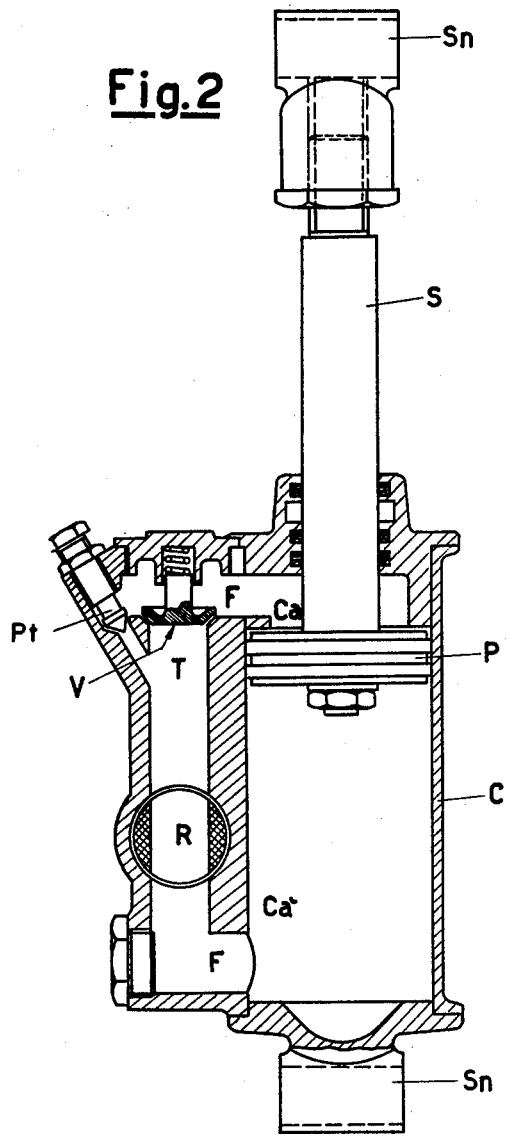
INVENTOR
MARIO TAMINI
BY
Stevens, Davis, Miller & Mosher
ATTORNEYS

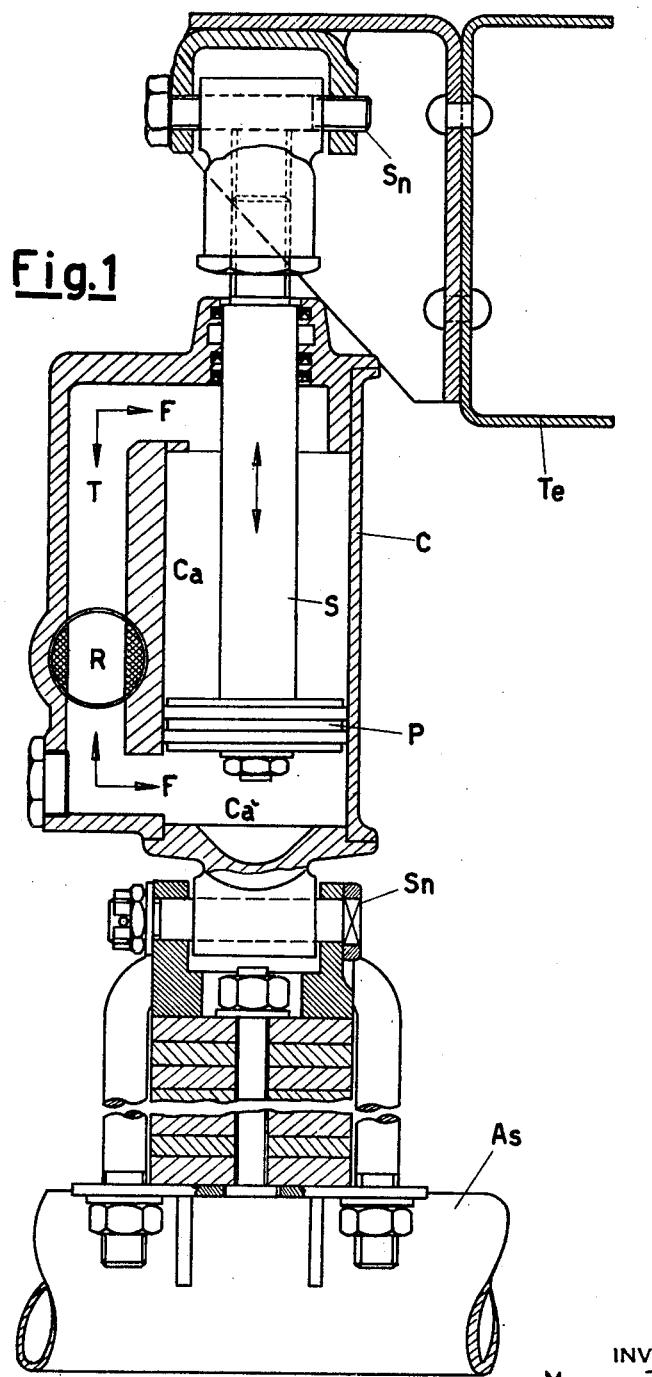

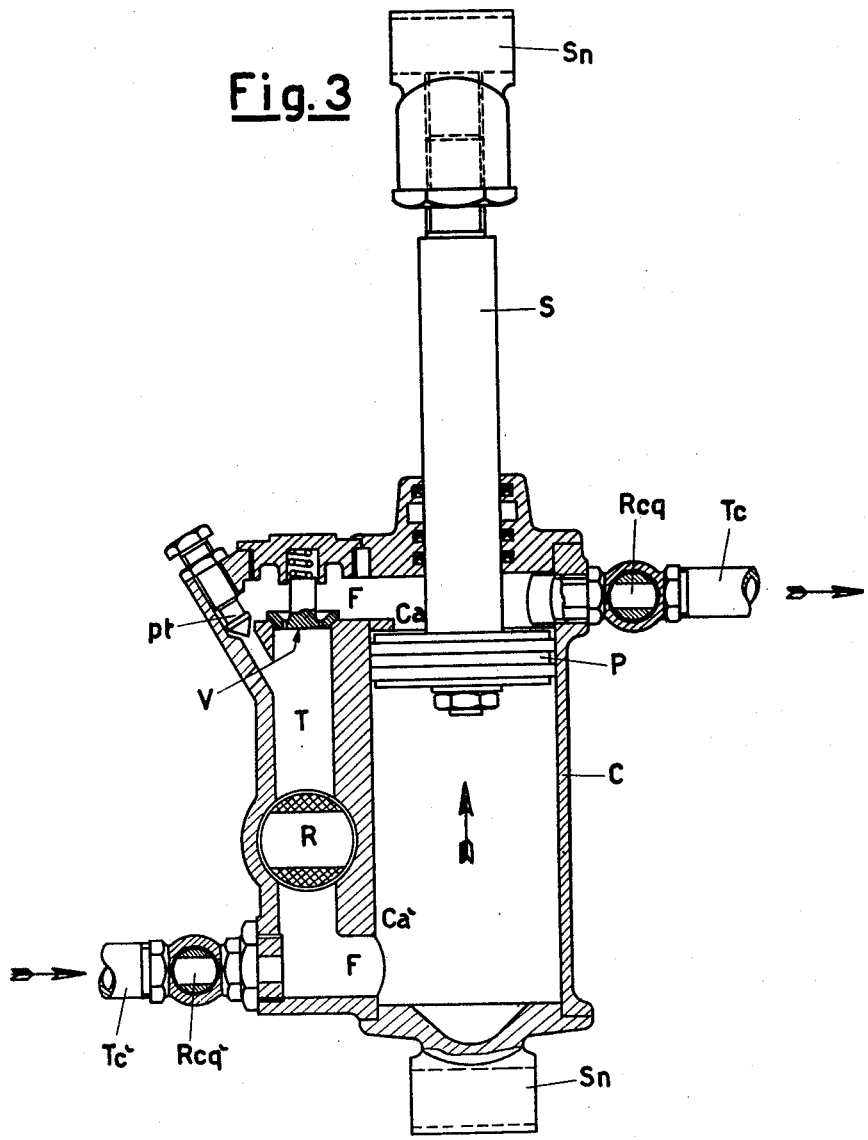

United States Patent Office 3,142,363
Patented July 28, 1964

3,142,363
STABILIZING AND SHOCK-ABSORBING DEVICE
Mario Tamini, Via Tranquillo Cremona 5, Milan, Italy
Filed Dec. 5, 1961, Ser. No. 157,180
Claims priority, application Italy Dec. 6, 1960
1 Claim. (Cl. 188—97)

The subject of the present invention is a stabilizing and shock-absorbing device which also corrects the height and slope of the loading platform of a vehicle.

As is known, it is often useful and in some cases essential on industrial motor vehicles to annul the action of the elastic suspension (springing): this is the case, for example when a ladder is pulled out on the sides of the vehicle and its weight, together with that of the persons using it, creates a moment which excessively loads the elastic suspension on one side of the vehicle, thus making it more liable to tip over. Amongst other examples we may mention motor vehicles provided with swivelling hoists for loading and unloading merchandise, tipping trucks, and the like.

And in many cases it is also useful if the entire weight of the vehicle and hence also the by no means negligible weight of the axles and wheels concerned, can be brought to bear against the moment tending to tip the vehicle over.

In some cases, in order to prevent the vehicle from tipping over, it is necessary to use struts or jacks supported on the ground, but in other cases these means provide excessive thrust and require, besides, a firm support base on the ground for the reactions of the jacks, a supply of mechanical power, a certain amount of handling, and so forth.

Another drawback connected with this method of supporting the chassis of a vehicle derives from the fact that when even a small shift in position is required for loading or unloading purposes, the struts or jacks must be removed and then put into operation again.

It has therefore been deemed useful to seek simple and rapid means which will annul the yielding of the elastic vehicle suspension without the need to employ struts or jacks, by simultaneously using the entire weight of the vehicle in opposition to the tipping moments. And this can, in many cases, be more than sufficient.

In fact, the stabilizing and shock-absorbing device according to the present invention, whereby the height of the sprung part of road and railway vehicles can be adjusted in relation to that of the unsprung part, is essentially characterized by a closed cylinder, sealed at its ends, fastened to one of said two parts, wherein there is axially movably fitted a plunger fastened to the other of said two parts and adapted to delimit, with the walls of the cylinder, two liquid-tight chambers of completely variable volume, and by a conduit which puts the ends of said two chambers into communication and is provided at an intermediate point thereof with a cut-off valve.

The device according to the invention will now be more fully described, for illustrative but non-limiting purposes only, with reference to the accompanying drawings wherein:

FIG. 1 shows the device according to the present invention, in vertical cross-section, in its function as a stabilizer;

FIG. 2 similarly shows it in its function as a shock-absorbing stabilizer; and

FIG. 3 similarly shows it in its function as a stabilizer, a shock-absorber and a height corrector.

With reference to the accompanying FIG. 1, the apparatus consists essentially of a cylinder C within which plunger P and stem S run. Plunger P divides cylinder C into two distinct chambers $Ca$ and $Ca'$, and suitable piston rings or gaskets assure the liquid-tight separation and sealing of said chambers. The device is connected at its top to the longitudinal beam $Te$ of the vehicle's chassis, and at its bottom to axle assembly $As$ through swivelling joint $Sn$.

At the ends of cylinder C there are holes F communicating with each other through a conduit or pipe T in which there is fitted a cock R which; when open allows a liquid (e.g. non-freezing oil) to pass freely and rapidly from one to the other chamber thus filling cylinder C and hence allowing plunger P and stem S to run inside cylinder C; and when closed separates the two chambers and so immobilizes plunger P and stem S.

By attaching two, four or more apparatuses as described, in a vertical position, by means of suitable swivelling joints, between the lower chassis member $Te$ (FIG. 1) and the axle assemblies of a vehicle, we obtain: with cock R open, the free sliding of plunger P and stem S in cylinder C in conformity with the reactions of the elastic suspension means of the moving vehicle as a result of jolts caused by obstacles or poor road surface; with cock R closed, when the vehicle is stationary, the barring of the passage of the (incompressible) liquid contained in the apparatuses, from one to the other chamber, and hence the immobility of the chassis whatever be the weight that is being loaded or unloaded.

In other words the action of the elastic suspension means is annulled and the chassis forms a single block with its load, axle assemblies and wheels.

If a valve V (FIG. 2) is placed in conduit T, said valve will allow the free and rapid passage of the liquid from chamber $Ca'$ to chamber $Ca$, but will prevent the return of the liquid from chamber $Ca$ to chamber $Ca'$, and plunger P will thus not be able to move towards chamber $Ca$.

A suitably adjustable valve $pt$ (FIG. 2) will permit the return of the liquid from chamber $Ca$ to chamber $Ca'$, but this return will be slow and will result in braking the violent return of the chassis on to the elastic suspension means, and consequently the shocks due to the heavy jolting caused by obstacles or the condition of the road. In other words, the apparatus thus supplemented may be considered not only as a stabilizer of the loading platform of a vehicle, but also as a shock-absorber with the same functions as those normally fitted to motor vehicles.

If now two cocks $Rcq$ and $Rcq'$ (FIG. 3) be fitted to the two ends of pipe T of the aforesaid apparatus with related tubes $Tc$ and $Tc'$ through which the liquid content of cylinder C is introduced into said cylinder or discharged therefrom, then with cock R of pipe T closed and cocks $Rcq$ and $Rcq'$ open and with the introduction at a suitable pressure of a liquid into, for example, chamber $Ca'$ through tube $Tc'$, plunger P will shift towards chamber $Ca$ and the liquid contained therein will be discharged into tube $Tc$. If the flow of the liquid is reversed, chamber $Ca$ will increase in volume and chamber $Ca'$ will diminish in volume.

By appropriately operating the cocks R, $Rcq$ and $Rcq'$ of the several apparatuses fitted to a motor vehicle. we can obtain:

the immobilization of the chassis whatever be the variations in the loading thereof;

the bringing of the chassis to the highest level allowed by the extension of the elastic suspension means of the vehicle, or to the lowest level that can be reached by the yielding of said suspension means (so-called buffering);

the variation in the inclination of the chassis in relation to the road surface.

These things are extremely useful in certain cases and not all of them are possible by using struts or jacks.

With the opening of cock R in pipe T and the closing of cocks $Rcq$ and $Rcq'$, the chassis returns to rest freely on the elastic suspension.

To conclude: the apparatus according to the present invention, when fitted in suitable numbers and positions, can function as:

(a) A stabilizer of the loading platform of a vehicle;
(b) A stabilizer and shock-absorber for the vehicle; and
(c) A stabilizer, shock-absorber and also an adjuster of the height of the loading platform, allowing (within certain limits) changes in the slope of said platform in relation to the road surface.

I claim:

A stabilizing device for a vehicle to maintain the loading platform of the vehicle at a constant level including a hydraulic cylinder with a movable piston therein, a piston rod fixed to said piston, means for connecting said piston rod to the chassis of the vehicle, other means for connecting the cylinder to an axle of the vehicle, passage means in communication with opposite ends of the cylinder and with opposite sides of said piston, valve means disposed in said passage means for cutting off communication with opposite sides of said piston whereby the loading platform of a vehicle is maintained at a constant level when loading it, a check valve disposed in said passage means to permit flow in one direction into one end of said cylinder, and a bleed valve means disposed in said passage means to by-pass liquid around said check valve.

References Cited in the file of this patent

UNITED STATES PATENTS

| | | |
|---|---|---|
| 404,528 | Foster | June 4, 1889 |
| 646,458 | Pedrick | Apr. 3, 1900 |
| 2,155,421 | Kenyon et al. | Apr. 25, 1937 |
| 2,336,096 | Heintz | Dec. 7, 1943 |
| 2,369,397 | Kostenick | Feb. 13, 1945 |
| 2,833,552 | Polhemus | May 6, 1958 |
| 2,902,288 | Dill | Sept. 1, 1959 |